United States Patent
Anflo et al.

(10) Patent No.: US 9,932,934 B2
(45) Date of Patent: Apr. 3, 2018

(54) REACTOR FOR AMMONIUM DINITRAMIDE-BASED LIQUID MONO-PROPELLANTS, AND THRUSTER INCLUDING THE REACTOR

(71) Applicant: ECAPS AB, Solna (SE)

(72) Inventors: Kjell Anflo, Haninge (SE); Peter Thormählen, Sundbyberg (SE)

(73) Assignee: ECAPS AB, Solna (SE)

( * ) Notice: Subject to any disclaimer, the term of this patent is extended or adjusted under 35 U.S.C. 154(b) by 687 days.

(21) Appl. No.: 14/399,422

(22) PCT Filed: May 7, 2013

(86) PCT No.: PCT/SE2013/050508
§ 371 (c)(1),
(2) Date: Nov. 6, 2014

(87) PCT Pub. No.: WO2013/169193
PCT Pub. Date: Nov. 14, 2013

(65) Prior Publication Data
US 2015/0121843 A1    May 7, 2015

Related U.S. Application Data

(60) Provisional application No. 61/644,772, filed on May 9, 2012, provisional application No. 61/764,322, filed on Feb. 13, 2013.

(30) Foreign Application Priority Data

May 9, 2012   (SE) .................................... 1250474

(51) Int. Cl.
*F02K 9/42*        (2006.01)
*F23R 3/40*        (2006.01)
(Continued)

(52) U.S. Cl.
CPC ........... *F02K 9/425* (2013.01); *B01J 37/0221* (2013.01); *C06B 31/28* (2013.01); *F02K 9/42* (2013.01);
(Continued)

(58) Field of Classification Search
CPC ... F02K 9/42; F02K 9/425; F02K 9/52; F23R 3/40
See application file for complete search history.

(56) References Cited

U.S. PATENT DOCUMENTS 3,301,651 A      1/1967   Long
7,137,244 B2 *  11/2006   Gronland ................. B01J 21/04
                                                          422/198

(Continued)

FOREIGN PATENT DOCUMENTS

KR   2011 0085072 A12       7/2011
WO      WO 02/095207 A1    11/2002

OTHER PUBLICATIONS

PCT International Search Report dated Sep. 12, 2013 issued in a related PCT International Application No. PCT/SE2013/050508 (3 pages).

(Continued)

*Primary Examiner* — Arun Goyal
(74) *Attorney, Agent, or Firm* — Robert P. Michal, Esq.; Carter, DeLuca, Farrell & Schmidt, LLP

(57) ABSTRACT

The present invention relates to a reactor for the decomposition of ammonium dinitramide-based liquid monopropellants into hot, combustible gases for combustion in a combustion chamber, and a rocket engine or thruster comprising such reactor, wherein the reactor comprises a heat bed exhibiting catalytic activity.

8 Claims, 5 Drawing Sheets

(51) Int. Cl.
*F23R 3/30* (2006.01)
*C06B 31/28* (2006.01)
*B01J 37/02* (2006.01)
*B01J 23/38* (2006.01)

(52) U.S. Cl.
CPC ............... *F23R 3/30* (2013.01); *F23R 3/40* (2013.01); *B01J 23/38* (2013.01)

(56) References Cited

U.S. PATENT DOCUMENTS

2007/0184971 A1   8/2007   Fokema et al.
2014/0308174 A1*  10/2014  Doura .................... F23C 13/04
                                                      422/170

OTHER PUBLICATIONS

PCT Notification of Transmittal of the International Preliminary Report on Patentability and PCT International Preliminary Report on Patentability dated May 22, 2014, which were issued in a related PCT International Application No. PCT/SE2013/050508 (11 pages).

* cited by examiner

REACTOR FOR AMMONIUM DINITRAMIDE-BASED LIQUID MONO-PROPELLANTS, AND THRUSTER INCLUDING THE REACTOR

CROSS-REFERENCE TO RELATED APPLICATIONS

This is a 371 national phase application of PCT International Application No. PCT/SE2013/050508 filed May 7, 2013, which claims the benefit of U.S. Provisional Patent Application Nos. 61/644,772, filed May 9, 2012 and 61/764, 322, filed Feb. 13, 2013, and Swedish Application No. 1250474-2, filed May 9, 2012, the entire disclosure of each of which is incorporated herein by reference.

FIELD OF THE INVENTION

The present invention relates to an improved reactor for ammonium dinitramide-based liquid monopropellants, such as High Performance Green Propulsion (HPGP) monopropellants, and a thruster comprising such reactor, especially a thruster of 0.5 N to a few k.

BACKGROUND ART

In launch and space vehicle applications, such as satellite launchers, satellites and other spacecrafts, liquid propellant thrusters, liquid propellant rocket engines and liquid propellant gas generators are often used. Such thrusters and rocket engines can for example be used for the purpose of orbit manoeuvring and attitude control, of satellites, and for example roll control and propellant settling in the main propulsion system of other space vehicles, in which case the rocket engines, or thrusters are often used in continues firing, off-modulation firing, pulse mode and single pulse firing, the duration of which typically can be fractions of a second to an hour. For such purposes small rocket engines, or thrusters are commonly used with a thrust of typically from 0.5 N to about 1.5 kN.

Such thrusters may be operated on ammonium dinitramide-(ADN)-based, liquid monopropellants, such as described in WO 2002/096832, and in WO 2012/166046. Some of the ADN-based, liquid monopropellants, are also being referred to as High Performance Green Propulsion (HPGP) monopropellants.

A reactor for the above ADN-based, liquid monopropellants has been described in WO 02/095207, as well as a thruster comprising the reactor. Such thrusters are also being referred to as HPGP thrusters.

The present inventors have found that, when operating a thruster as described in WO 02/095207 in certain pulse modes, hard starts are encountered. A hard start implies an overpressure condition during the ignition of the propellant in the thruster. In the worst cases, this takes the form of an explosion. A single hard start is obviously detrimental to the engine, and in worst case even fatal. The problem of hard starts has been observed for thrusters of 5N, 22 N and 200 N when operating the thruster on a liquid, ADN-based monopropellant.

Thus, it is an objective of the present invention to eliminate, or at least to suppress hard starts, which are detrimental to the thruster within its specified operating range, and, in addition, to maintain nominal response times for the thruster, since the rise and decay time significantly increases at hard starts when using liquid ammonium dinitramide-based monopropellants.

Other objects and advantages of the present invention will become evident from the following description, examples, and the attached claims.

The terms "rocket engine" and "thruster" will be used interchangeably herein to designate the portion of the inventive liquid propellant rocket engine, into which the propellant is injected, extending downstream to, and including, the nozzle.

The thrust of the inventive rocket engine referred to herein is typically from 0.5 N to a few kN, such as 0.5 to about 3 kN, or 0.5 to 1 kN, and more preferably from 0.5 N to about 500 N.

SUMMARY OF THE INVENTION

For a thruster as described in WO 02/095207, the above problem has been solved by means of the characterising technical feature of claim 1, according to which the heat bed exhibits catalytic activity, which initiates the decomposition/combustion of the propellant in the heat bed.

Accordingly, in one aspect the invention relates to a reactor as set forth in claim 1.

In another aspect the present invention relates to a thruster including the inventive reactor.

For solving the above problem for a thruster of about 20 N or more, the inclusion of an inner, reactor housing, separating the heat bed and catalyst bed from contact with the inner surface of the hollow body 5 has been found to be beneficial. Such "inner, reactor housing" is also referred to as "heat bed and catalyst bed housing". Accordingly, in one embodiment the inventive reactor and thruster include an inner, reactor housing. Such inner, reactor housing has been disclosed in U.S. 61/644,794, and in applicant's co-pending US provisional application filed on even date herewith. In a preferred embodiment, the inner, reactor housing is provided with structural elements further improving the heat transfer capability upstream in the engine. For example the heat bed retainer may be provided with flanges, will be described in greater detail below.

It may be advantageous to include such inner, reactor housing also in smaller engines, such as of less than 20 N, in order to further improve the reheating of the heat bed and in order to shorten the recovery time from one pulse to the following. For practical reasons, however, i.e. due to the small dimensions and associated added complexity, an inner, reactor housing will rarely be used in thrusters of 5 N or less.

The inventive reactor and thruster are also believed to be suitable for HAN-based liquid monopropellants, due to the similarity of the decompositions pathways of ammonium dinitramide (ADN), and hydroxyl ammonium nitrate (HAN), respectively.

The liquid monopropellants used in the invention are typically aqueous.

BRIEF DESCRIPTION OF THE ATTACHED DRAWINGS

FIG. 1 illustrates a reactor, wherein 5 is a hollow body, 10 a propellant feed pipe, 20 an injector, 25 a heat bed exhibiting catalytic activity comprising pellets 26, 27 is a heat bed retainer, 30 a catalyst bed containing catalyst pellets 35, and 40 is a catalyst bed retainer.

In connection with the reactor, the hollow body 5 will also be referred to as reactor housing 5.

FIG. 2 illustrates a rocket engine of the invention, i.e. an improved HPGP thruster, comprising the inventive reactor, wherein 50 denotes a combustion chamber.

In connection with the thruster, the hollow body 5 will also be referred to as thruster housing 5 or thruster envelope 5.

Figure 5:
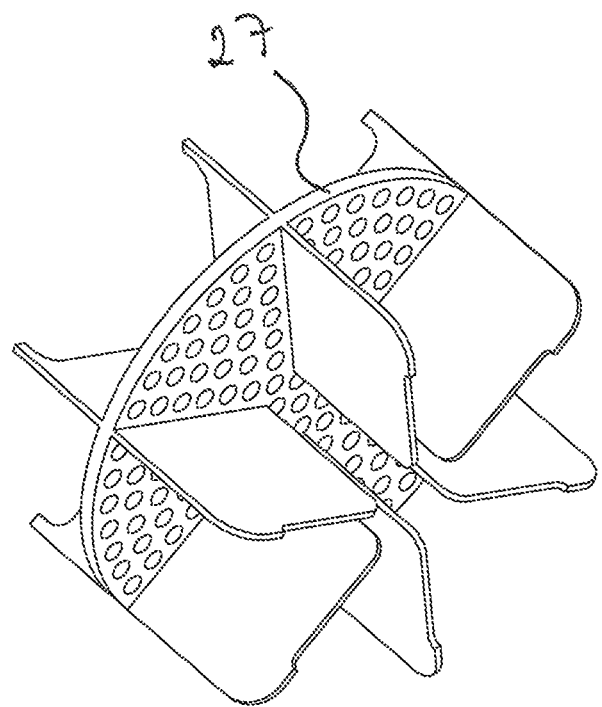

FIG. 5 shows a preferred embodiment of the heat bed retainer 27 provided with flanges extending upstream into the inventive catalytic heat bed 25 and downstream into the catalyst bed 30. The retainer is shown from the downstream side.

DETAILED DESCRIPTION OF THE INVENTION

The present inventors have established that the hard starts observed during pulsed mode firing are due to undue cooling of the heat bed. Hard starts have been observed in the medium to high duty region in combination with relatively short pulses, such e.g. a duty factor of at least about 5%, and a duration of the pulse of from about 100 ms to a few seconds. Duty factor, given as a percentage, is defined herein as $100\ T_{ON}/(T_{ON}+T_{OFF})$.

Before firing the thruster, the reactor is pre-heated to a sufficient temperature, typically 300° C. to 400° C. (depending on bed load and specific monopropellant). The reaction will start already with a heat bed temperature above 200° C., but in order to obtain a nominal start 350° C. is preferred. During a long pulse or steady state firing, heat generated in the catalytic bed and in the combustion chamber will be sufficient to continuously heat monopropellant being injected into the thruster, so that the monopropellant is essentially in the gaseous state when entering the catalyst bed. If liquid phase monopropellant enters the catalyst bed, disintegration of the porous catalyst bodies may result due to the high vapour pressure formed within the porous bodies when exposed to heat from the combustion downstream. Also, a hard start will typically occur when liquid phase monopropellant fills a significant part of the heat bed due to ignition delay.

During pulsed mode firing, depending on the specific duty, and the duration of the pulses, the heat generated in the catalyst bed and in the combustion chamber may not be transferred fast enough to reheat the heat bed, resulting in the heat bed being cooled down to a temperature well below the required preheating temperature. For example, for a 22 N thruster hard starts tend to occur at a duty of at least about 10% and a duration of the pulse of from about 100 ms to a few seconds.

Pulsed mode firing is also typically associated with a higher bed load, i.e. a larger mass of propellant flowing through a given cross section of the catalytic bed per unit of time, than e.g. during steady state firing.

The present inventors have found the problem of hard starts during pulsed mode firings to be even more pronounced with the newly developed monopropellants described in WO 2012/166046, such as e.g. the monopropellant designated 1127-3, having a lower energy content and higher cooling effect than e.g. LMP-103S.

Figure 3:
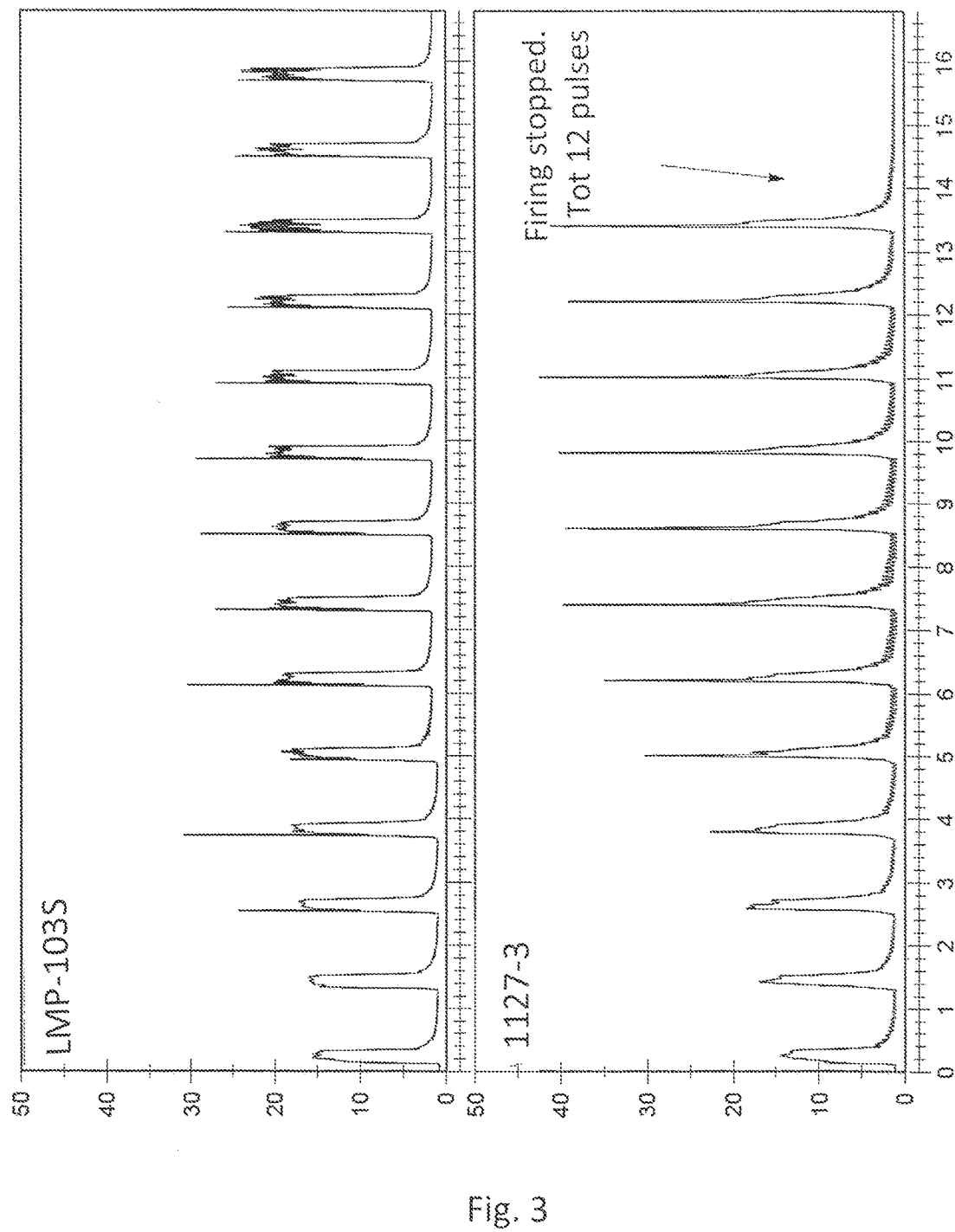
FIG. 3 illustrates the problem of hard starts on a conventional 22 N HPGP thruster in pulse mode firing using two different liquid, ADN-based monopropellants, i.e. LMP-103S and 1127-3 (corresponding to the monopropellant of Example 3 in WO 2012/166046), respectively.

FIG. 3 shows the thrust response for LMP-103S and 1127-3 in a conventional 22 N thruster using pulse mode firing with a $T_{ON}$=230 ms, and a $T_{OFF}$=1 s. As can be seen hard starts were encountered with LMP-103S, but are far more severe when using 1127-3.

During single pulse firing, however, the above two different monopropellants are comparable. For example, for a single pulse firing of 1 s on a conventional 22 N HPGP thruster, the two different monopropellants exhibit similar thrust profile, combustion stability and response times, except for a more rapid cooling of the heat bed in case of the latter.

The above problem has been solved by means of providing catalytic activity to the heat bed.

The present inventors have found that by providing catalytic activity to the heat bed, the decomposition/combustion of the propellant can thereby be initiated further upstream in the engine, which in turn will produce more heat of reaction in the heat bed, thereby counteracting cooling of the heat bed during pulsed firing by more efficient reheating of the heat bed.

WO 02/095207 suggests that by including catalytic activity in the heat bed for the purpose of enhanced decomposition of ADN, it might be possible to reduce the required preheating temperature.

In the present invention, however, catalytic activity is included in the heat bed for a different purpose, which will not affect the required preheating temperature, but will instead shift the decomposition/combustion of the propellant upstream in the engine. The catalytic activity of the present invention is therefore clearly of a different kind than that suggested in WO 02/095207.

Accordingly, as opposed to the catalytic activity suggested in WO 02/095207 for inclusion in the heat bed, the catalytic activity in the heat bed as used in the present invention will increase the temperature in the heat bed during operation of the engine. The increased temperature, in combination with the loads induced by the liquid to gas phase transfer within the heat bed, is very demanding upon a catalyst and a different catalyst than used downstream must therefore be used.

A suitable catalyst for use in the heat bed must be resistant to contact with the liquid propellant at elevated temperatures, resistant to thermal shock, resistant to the liquid to gas phase transfer of the propellant, be catalytically active for the combustion of the specific propellant, and be resistant to high temperatures in presence of the combustion gases. The combustion temperatures of ADN-based propellants are normally in the range of 1500-1800° C., and under certain operational conditions the heat bed may be subjected to such temperatures, especially the downstream portion of the heat bed. Suitable catalytic heat bed materials are non-porous or low-porous (in order to avoid liquid entry into the catalyst body) high-temperature-resistant ceramic and/or metallic materials, coated with a catalytically active noble metal, preferably selected from Ir, Pd, Pt, Rh, Ru, etc., or any combination thereof. The preferred shape of the catalytic heat bed material 26 is pellets, but also honeycomb structures may be suitable. When the heat bed material 26 is provided in the form of pellets, a suitable size of the pellets 26 is about one tenth, or less, preferably about one tenth, of the inner diameter of the reactor housing 5, or, when an inner reactor housing is present, about one tenth, or less, preferably about one tenth of the inner diameter of the inner reactor housing.

The reactor of the invention preferably forms part of a rocket engine or thruster.

Figure 1:
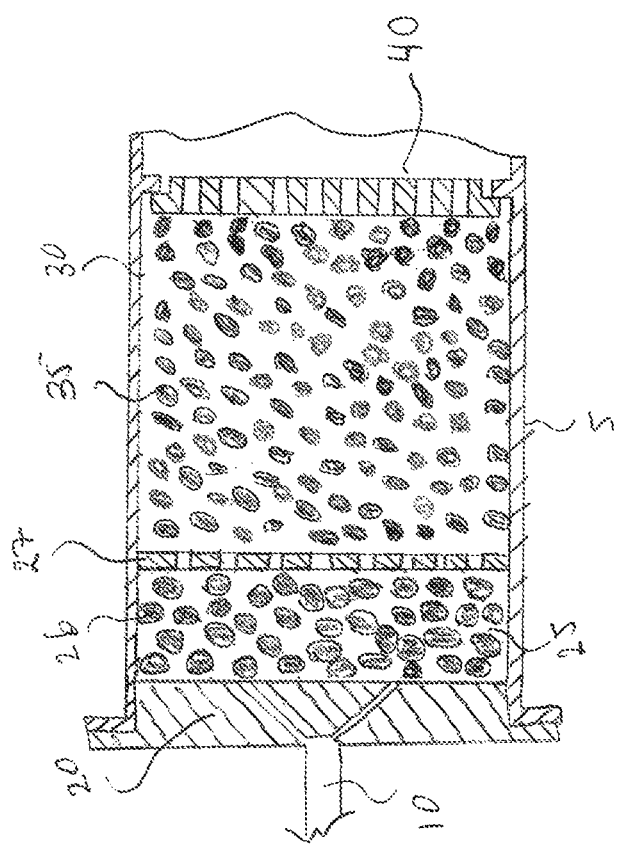

In its most general embodiment, and with reference to FIG. 1, the reactor of the invention comprises a hollow body 5 provided with, from the upstream end; an injector 20;

a heat bed 25 exhibiting catalytic activity by virtue of heat bed material 26;

a retainer 27 separating the heat bed from the catalyst bed;

a catalyst bed 30 of porous catalyst pellets 35 which are heat and sintering resistant to a temperature of at least 1000° C.;

a retainer 40 for retaining the catalyst bodies in the catalyst bed.

The overall void volume in the reactor is essentially formed of any interstitial spaces within the heat bed material contained in the heat bed, any interstitial spaces within the catalyst bed material contained in the catalyst bed, and of the porosity of the material in the catalyst bed. The hollow body 5 is thermally conductive and the heat bed and catalyst bed are in thermal contact with the hollow body 5.

Figure 2:
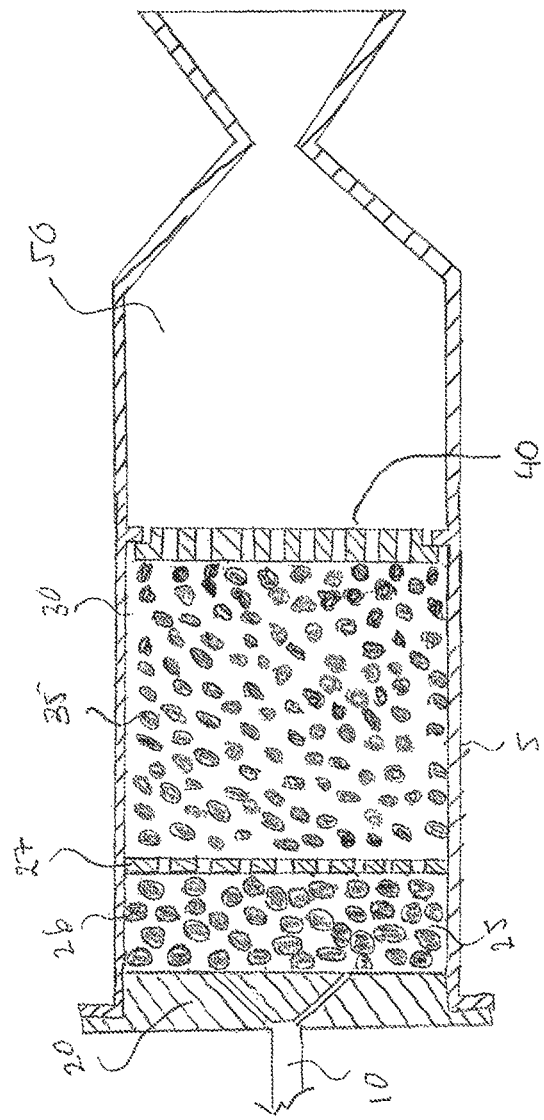

In the case of a rocket engine, the reactor forms part of the engine as shown in FIG. 2. For simplicity, any conventionally used parts which are attached to a rocket engine, such as the upstream parts; e.g. propellant feed system, propellant valve, thermal standoff, etc., as well as a heater for heating the heat bed (as conventionally used for heating the catalyst bed in the case of a hydrazine engine) and thermal standoff for the heater, have been excluded from the Figure. The skilled person will immediately recognise which further parts are required for the rocket engine, having read this disclosure. Accordingly, the hollow body confining the reactor is the hollow body of the engine, into which body the propellant is injected and combusted. Thus, there is a combustion chamber downstream of the reactor, for combustion the combustible components generated by the reactor.

Components of the Reactor, and of the Thruster

Injector 20

The injector is not critical to the invention, as long as it is able to perform its intended function, i.e. to distribute the propellant evenly over the heat bed. Suitable injectors are known in the art and will not be described further herein.

The Heat Bed 25

The heat bed is provided in order to vaporise the propellant before entering into the catalyst bed. The heat bed must exhibit sufficient heat capacity in order to vaporise a sufficient portion of the propellant being fed into the bed during start and before heat is being transferred upstream to the bed. The heat bed must also exhibit a sufficient thermal conductivity in order to be able to dissipate heat throughout the bed, which heat partly will be transferred from downstream to the bed via the reactor walls of the reactor body 5. The heat it then transferred to the propellant flowing through the bed. Furthermore, the material of the bed must be able to withstand any detrimental impact from components generated on decomposition of ADN in the bed, such as, e.g., nitric acid. Accordingly, the material of the heat bed should e.g. be acid resistant.

Retainer 27 for the Heat Bed 25

The retainer serves to keep the heat bed in place, and to keep it separate from the catalyst bed downstream. An example of a suitable retainer is a perforated plate of Ir or Ir supported by Re, as Ir is inert to the relevant combustion species.

In a preferred embodiment the retainer is provided with flanges, or similar structure, extending upstream into the inventive catalytic heat bed. The flanges will serve to improve the heat leading capacity back, upstream in the engine during operation thereof, and will thus improve the reheating of the catalytic heat bed, by effectively transferring heat back upstream from the heat bed retainer to the heat bed material.

In an alternative preferred embodiment the heat bed retainer is provided with flanges, or similar structure, extending downstream into the catalyst bed. The flanges will serve to improve the heat leading capacity back, upstream in the engine during operation thereof, and will thus improve the reheating of the catalytic heat bed, by effectively transferring heat back upstream from the catalyst bed to the heat bed retainer.

When a heat bed 27 retainer having flanges extending downstream into the catalyst bed is being used, said flanges may rest against catalyst bed retainer 40.

In a more preferred embodiment, for even more efficient reheating of the heat bed, the heat bed retainer exhibits flanges or a similar structure, extending upstream into the inventive catalytic heat bed, and downstream into the catalyst bed. Such embodiment of the heat bed retainer 27 is shown in FIG. 5 and will further improve the heat transfer from the catalyst bed to the inventive catalytic heat bed.

Catalyst Bed 30

A suitable catalyst bed has been described in WO 02/095207, and will not be described in any detail herein. Suitable catalyst material and pellets are known in the art and have been described in WO 02/094717 and WO 02/094429, respectively. A suitable size of the pellets 35 of the catalyst bed 30 is about one tenth, or less, preferably about one tenth, of the inner diameter of the reactor housing 5, or, when an inner, reactor housing is present, about one tenth, or less, preferably about one tenth of the inner diameter of the inner reactor housing.

Retainer 40 for the Catalyst Bed 30

The catalyst bed is kept in place by a retainer. An example of a suitable retainer is a perforated plate of Ir or Ir supported by Re, as Ir is inert to the relevant combustion species.

Inner Rector Housing (Not Shown)

An inner, reactor housing, separating the heat bed and catalyst bed from contact with the inner surface of the hollow body 5 may preferably be used. Such "inner, reactor housing" is also referred to as "heat bed and catalyst bed housing". Accordingly, in one embodiment the inventive reactor and thruster include an inner reactor housing. The inner reactor housing will serve to further improve the reheating of the heat bed, and will also shorten the recovery time from one pulse to the following. The inner, reactor housing could be made integral with catalyst bed retainer 40, which will form the bottom of the inner reactor housing, but is preferably made separate from catalyst bed retainer 40, in order to be able to allow for expansion, especially in the radial direction, of the catalyst bed retainer in relation to the surrounding bottom of the inner reactor housing. Also, the heat bed and heat bed retainer will be accommodated within the inner, reactor housing. In a preferred embodiment the heat bed retainer is provided with flanges as described above. When a heat bed retainer having flanges extending downstream into the catalyst bed is being used, said flanges may rest against catalyst bed retainer 40. In order to allow for expansion, especially in the radial direction, of the catalyst bed retainer in relation to the surrounding bottom of the inner reactor housing, catalyst bed retainer 40 may for example rest on a circumferential flange in the bottom of the inner reactor housing.

The Combustion Chamber 50 (In the Case of a Thruster)

The walls of the reactor, including the combustion chamber, must be able to withstand the high temperatures generated during combustion of the propellant. They must also be resistant to any exhaust gases or intermediary decomposition products generated in the reactor. A suitable material for long-lifetime applications is rhenium. In order to withstand the nitric gases generated in the final steps of the decomposition the combustion chamber portion of the walls are suitably lined with iridium.

Suitable materials for the different parts of the engine downstream of the injector, such as reactor housing, thruster envelope, and retainers, are e.g. Ir and Re. In applications designed for a shorter life time, or lower temperatures, other materials, such as the molybdenum alloys TZM and MHC, alloys of platinum, and other alloys of molybdenum may also be suitable.

Function of the Reactor and Process of Decomposition

Except for the inventive catalytic heat bed, the internal structural element extending into the heat bed and/or catalyst bed, and the inner reactor housing, the general function of the reactor and its components, as well as the process of decomposition are already known from WO 02/095207, and will not be described in any detail herein.

The heat bed of WO 02/095207 will vaporise the propellant, and, at the same time, initiate the thermal decomposition of ADN, which, according to the reaction scheme set forth in WO 02/095207, is necessary in order to perform the complete catalytic combustion of the propellant in the catalyst bed downstream.

The inventive catalytic heat bed, on the other hand, additionally initiates the final catalytic decomposition/combustion of the propellant which generates heat further upstream in the inventive engine, as compared to the prior art engine wherein the heat is mainly generated in the catalyst bed.

EXAMPLES

In the Examples, a 22 N thruster was operated in pulse mode firing with a $T_{ON}$=230 ms, and a $T_{OFF}$=1 s using the liquid ADN-based monopropellant, designated 1127-3.

Example 1 (Comparative)

In this Example, a 22 N HPGP thruster of the general concept as disclosed in WO 02/095207 was used, the only difference from the inventive thruster being that the thruster used had a heat bed with no catalytic activity.

Figure 4:
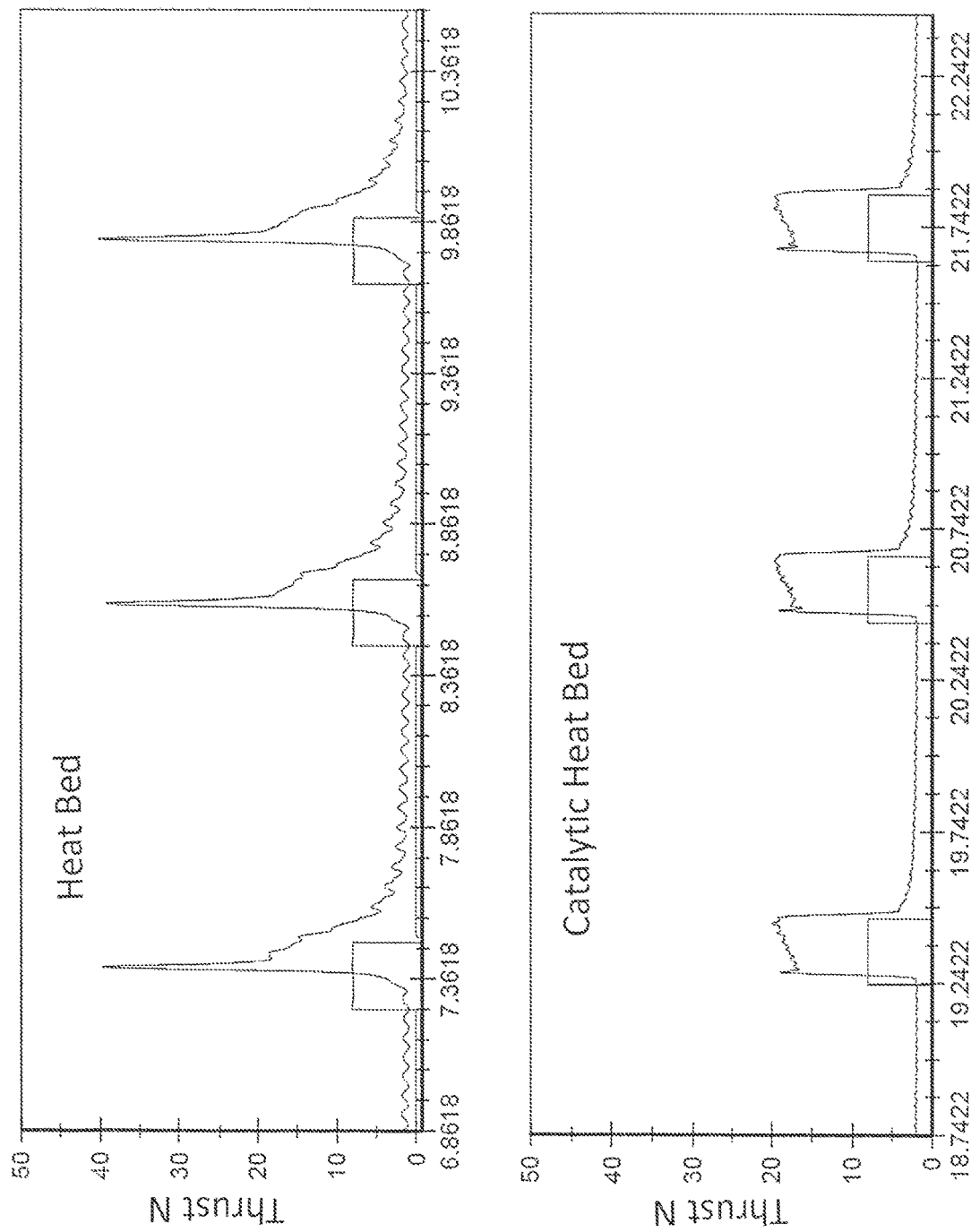
FIG. 4 shows the thrust response during pulse mode firing using a conventional 22 N HPGP thruster (FIG. 4A) as compared to a 22 N HPGP thruster of the invention (FIG. 4B) using one and the same liquid, ADN-based monopropellant, i.e. 1127-3.

The result is depicted in FIG. 4A showing the flow control valve command vs. the thrust. As can be seen hard starts occur, and there is also a delay in the thrust envelope as compared to the flow control valve command.

Example 2 (Inventive)

In this Example, a 22 N HPGP thruster of the invention was used, having a heat bed with catalytic activity.

The result is depicted in FIG. 4B showing the flow control valve command vs. the thrust. As can be seen there are no hard starts, and there is essentially no delay in the thrust envelope as compared to the flow control valve command.

As previously mentioned, the inventive reactor and thruster are also believed to be suitable for HAN-based liquid monopropellants by virtue of the similar decomposition pathways of HAN and ADN, respectively.

The invention claimed is:

1. A reactor for decomposition of a liquid ammonium dinitramide-based monopropellant into hot, combustible gases, the reactor comprising:
   a hollow body of a thermally conductive, heat resistant metallic material provided with, from the upstream end:
      an injector;
      a heat bed;
      a heat bed retainer including a perforated plate and a plurality of flanges extending from the perforated plate in an axial direction towards the upstream end of the hollow body into the heat bed and/or towards a downstream end of the hollow body into a catalyst bed;
      the catalyst bed of porous catalyst pellets which are heat resistant up to a temperature of at least 1000° C.; and
      a catalyst bed retainer,
   wherein the heat bed comprises a heat bed material exhibiting catalytic activity, which material is formed from non-porous or low-porous high-temperature-resistant ceramic and/or metallic materials, coated with a catalytically active noble metal.

2. The reactor of claim 1, wherein the catalytically active noble metal is selected from the group of Ir, Pd, Pt, Rh, Ru, or a combination thereof.

3. The reactor of claim 1, wherein the heat bed material is in the form of heat bed pellets.

4. The reactor of claim 3, wherein the porous catalyst pellets and the heat bed pellets are about one tenth, or less, in size of an inner diameter of the hollow body.

5. A rocket engine for an ammonium dinitramide-based liquid monopropellant, the rocket engine comprising:
   a reactor including:
      a hollow body of a thermally conductive, heat resistant metallic material provided with, from the upstream end:
         an injector;
         a heat bed;
         a heat bed retainer including a perforated plate and a plurality of flanges extending from the perforated plate in an axial direction towards the upstream end of the hollow body into the heat bed and/or towards a downstream end of the hollow body into a catalyst bed;
         the catalyst bed of porous catalyst pellets which are heat resistant up to a temperature of at least 1000° C.; and
         a catalyst bed retainer,
      wherein the heat bed comprises a heat bed material exhibiting catalytic activity, which material is formed from non-porous or low-porous high-temperature-resistant ceramic and/or metallic materials, coated with a catalytically active noble metal; and
   a combustion chamber immediately downstream of the reactor.

6. The rocket engine of claim 5, dimensioned so as to have a thrust within the interval of from 0.5 N to a few kN, such as from 0.5 to about 3 kN, preferably from 0.5 N to 1 kN, and more preferably from 0.5 N to 500 N.

7. A method for decomposition of a liquid, HAN-based monopropellant into hot, combustible gases, with a reactor including a hollow body of a thermally conductive, heat resistant metallic material provided with, from the upstream end:
   an injector;
   a heat bed;

a heat bed retainer including a perforated plate and a plurality of flanges extending from the perforated plate in an axial direction towards the upstream end of the hollow body into the heat bed and/or towards a downstream end of the hollow body into a catalyst bed;

the catalyst bed of porous catalyst pellets which are heat resistant up to a temperature of at least 1000° C.; and a catalyst bed retainer, the method comprising:

flowing the liquid, HAN-based monopropellant through the injector such that the heat bed vaporizes the liquid, HAN-based monopropellant, the heat bed including a heat bed material exhibiting catalytic activity, the heat bed material formed from non-porous or low-porous high-temperature-resistant ceramic and/or metallic material, coated with a catalytically active noble metal; and transferring heat by extending the plurality of flanges of the heat bed retainer upstream into the heat bed and/or downstream into the catalyst bed.

8. A method for decomposition of a liquid, HAN-based monopropellant into hot, combustible gases, with a rocket engine for an ammonium dinitramide-based liquid monopropellant, the rocket including:

a reactor including:

a hollow body of a thermally conductive, heat resistant metallic material provided with, from the upstream end:

an injector;

a heat bed;

a heat bed retainer including a perforated plate and a plurality of flanges extending from the perforated plate in an axial direction towards the upstream end of the hollow body into the heat bed and/or towards a downstream end of the hollow body into a catalyst bed;

the catalyst bed of porous catalyst pellets which are heat resistant up to a temperature of at least 1000° C.; and a catalyst bed retainer, and immediately downstream of the reactor a combustion chamber, the method comprising:

flowing the liquid, HAN-based monopropellant through the injector such that the heat bed vaporizes the liquid, HAN-based monopropellant, the heat bed including a heat bed material exhibiting catalytic activity, the heat bed material formed from non-porous or low-porous high-temperature-resistant ceramic and/or metallic materials, coated with a catalytically active noble metal; and transferring heat by extending the plurality of flanges of the heat bed retainer upstream into the heat bed and/or downstream into the catalyst bed.

\* \* \* \* \*